US009538474B2

(12) United States Patent
Ganesh et al.

(10) Patent No.: US 9,538,474 B2
(45) Date of Patent: Jan. 3, 2017

(54) REDUCING SWITCHING BETWEEN NETWORKS TO CONSERVE POWER AND REDUCE COSTS

(71) Applicant: QUALCOMM Incorporated, San Diego, CA (US)

(72) Inventors: Shriram Ganesh, San Diego, CA (US); Jose Roberto Menendez, Encinitas, CA (US)

(73) Assignee: QUALCOMM Incorporated, San Diego, CA (US)

( * ) Notice: Subject to any disclaimer, the term of this patent is extended or adjusted under 35 U.S.C. 154(b) by 16 days.

(21) Appl. No.: 14/486,747

(22) Filed: Sep. 15, 2014

(65) Prior Publication Data

US 2016/0081027 A1 Mar. 17, 2016

(51) Int. Cl.
*H04W 4/00* (2009.01)
*H04W 52/02* (2009.01)
(Continued)

(52) U.S. Cl.
CPC ......... *H04W 52/0251* (2013.01); *H04W 36/24* (2013.01); *H04W 48/02* (2013.01);
(Continued)

(58) Field of Classification Search
CPC .. H04W 80/04; H04W 36/18; H04W 36/0011; H04W 36/14; H04W 36/08; H04W 52/0251; H04W 52/0209; H04W 48/18; H04W 36/24; H04W 36/0022; H04W 48/02; H04W 60/04; H04L 47/10; H04L 47/30; H04L 47/11; H04L 47/12; H04L 12/5602; H04L 47/27; H04L 2012/5635; Y02B 60/50
(Continued)

(56) References Cited

U.S. PATENT DOCUMENTS 6,760,303 B1 * 7/2004 Brouwer ............... H04W 36/06
370/229
7,099,622 B2 * 8/2006 Meyer .................. H04W 36/06
370/299

(Continued)

OTHER PUBLICATIONS

China Telecom et al., "Countering Ping Pong Handover Mobility Solution," SA WG2 Meeting #96, SA WG2 Temporary Document, S2-130978, San Diego, California, USA, Apr. 8-12, 2013, 2 pgs., 3rd Generation Partnership Project.

(Continued)

*Primary Examiner* — Brenda H Pham

(74) *Attorney, Agent, or Firm* — Holland & Hart LLP

(57) ABSTRACT

Methods, systems, and devices are described for reducing switches (e.g., ping-pongs) of a wireless communications device between two or more wireless networks. For example, a method includes determining a context of data use of a first wireless network to which a wireless communications device is connected. The method includes determining a time delay associated with performing a switch from the first wireless network to a second wireless network when at least one performance indicator of the first wireless network is below a threshold performance level needed to support the context of data use. The method further includes performing the switch from the first wireless network to the second wireless network in response to the time delay expiring while the at least one performance indicator remains below the threshold performance level.

26 Claims, 9 Drawing Sheets

(51) Int. Cl.
   *H04W 48/18* (2009.01)
   *H04W 36/24* (2009.01)
   *H04W 48/02* (2009.01)
   *H04W 36/00* (2009.01)
   *H04W 60/04* (2009.01)

(52) U.S. Cl.
   CPC ....... *H04W 48/18* (2013.01); *H04W 52/0209* (2013.01); *H04W 36/0022* (2013.01); *H04W 60/04* (2013.01); *Y02B 60/50* (2013.01)

(58) Field of Classification Search
   USPC .................... 370/331, 229, 231, 235, 332
   See application file for complete search history.

(56) References Cited

U.S. PATENT DOCUMENTS

| | | |
|---|---|---|
| 7,738,873 B2 | 6/2010 | Jagadeesan et al. |
| 8,614,990 B1 | 12/2013 | Mistry et al. |
| 2009/0253434 A1 | 10/2009 | Hayashi et al. |
| 2011/0086635 A1 | 4/2011 | Grob-Lipski |
| 2012/0113862 A1 | 5/2012 | Santhanam et al. |
| 2013/0121155 A1 | 5/2013 | Agarwal et al. |
| 2013/0301617 A1 | 11/2013 | Kuhn et al. |
| 2013/0331103 A1 | 12/2013 | Yang et al. |
| 2014/0113628 A1 | 4/2014 | Sundararajan et al. |

OTHER PUBLICATIONS

ISA/EPO, International Search Report and Written Opinion of the International Searching Authority, Int'l. App. No. PCT/US2015/048498, Dec. 7, 2015, European Patent Office, Rijswijk, NL, 13 pgs.

IPEA/EP, Second Written Opinion of the International Preliminary Examining Authority, Int'l Application No. PCT/US2015/048498, Sep. 4, 2015, European Patent Office, Munich, DE, 7 pgs.

* cited by examiner

REDUCING SWITCHING BETWEEN NETWORKS TO CONSERVE POWER AND REDUCE COSTS

BACKGROUND

The following relates generally to wireless communication, and more specifically to switching between two wireless networks. Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, bandwidth, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems used commonly for communication in Cellular networks, Wi-Fi networks, and the like.

Generally, a wireless multiple-access communications system may include a number of devices (or nodes or stations). A device, such as a wireless communications device, typically favors staying connected to an established wireless network connection (e.g., a Wi-Fi network) until the signal strength weakens or under-performs. When the signal strength of the wireless network connection weakens beyond a threshold, the wireless communications device may switch to another available connection (e.g., a Long Term Evolution (LTE) network) that has signal strength above a threshold. In some cases, the device may connect to the second wireless connection for a period of time before the device reconnects to the first wireless connection. This period of time may be short such that the switch is either not detected by a user and/or does not affect the user experience provided by the device. This type of short handover is referred to as a ping-pong herein. Thus, in some cases, a device may perform unnecessary ping-pongs, which may result in greater battery drain and more mobile data use.

SUMMARY

The described features generally relate to one or more improved systems, methods, and/or apparatuses for switching between different wireless networks based on at least one parameter of data use of one of the networks. For example, a wireless communications device may be connected to a first wireless network, such as a Wi-Fi network. A user of the wireless communications device may or may not be using the Wi-Fi network to exchange data at any given time. In a situation where the wireless communications device begins to receive only a weak or under-performing signal from the Wi-Fi network, the wireless communications device may consider switching to a second network, such as an LTE network, if one is available. As described herein, the wireless communications device may or may not actually switch to the LTE network based on at least one factor, including, among other examples, an amount and/or frequency of data use of the Wi-Fi network, a context of data use of the Wi-Fi network, and a location of the wireless communications device with respect to the Wi-Fi network.

In a first set of illustrative examples, a method for wireless communication is described. In one configuration, the method includes determining a context of data use of a first wireless network to which a wireless communications device is connected. The method may also include determining a time delay associated with performing a switch from the first wireless network to a second wireless network when at least one performance indicator of the first wireless network is below a threshold performance level needed to support the context of data use. The method may also include performing the switch from the first wireless network to the second wireless network in response to the time delay expiring while the at least one performance indicator remains below the threshold performance level.

In another example, the method also includes determining an amount of data use, a frequency of data use, or a combination thereof and maintaining a connection of the wireless communications device to the first wireless network based, at least in part on, the determined amount or frequency of data use. In some examples of the method, the amount of data use is determined to be intermittent, the frequency of data use is determined to be intermittent, or a combination thereof.

In some examples of the method, determining the time delay further includes one of setting the time delay to zero responsive to the context of data use is a real-time data use, setting the time delay to a first time period that is less than a buffer size time period responsive to the context of data use being a streaming content data use, setting the time delay to a second time period responsive to the context of the data use being an intermittent data use, and setting the time delay to a third time period longer than the second time period responsive to the context of the data use being no data use for a fourth time period.

In another example, the method also includes determining a geographical location of the wireless communications device and adjusting the time delay responsive to the wireless communications device being located within proximity of the first wireless network. In further examples, the method may include maintaining the connection to the first wireless network responsive to the wireless communications device being located within proximity of the first wireless network. The method may also include determining a previous pattern of travel of the wireless communications device within a predetermined distance of the first wireless network and adjusting the time delay based at least in part on the previous pattern of travel. In some examples of the method, adjusting the time delay further includes adjusting the time delay to a first time period if the previous pattern of travel of the wireless communications device indicates the wireless communications device will return or remain within proximity of the first wireless network during the first time period.

The at least one performance indicator may be a signal strength of the first wireless network, a signal quality of the first wireless network, a profile of the first wireless network, or a combination thereof. In some examples, the method may further include determining the at least one performance indicator is above the threshold performance level for the first wireless network. The method may also include performing a switch back to the first wireless network responsive to the at least one performance indicator being above the threshold performance level and based at least in part on a context of data use of the second wireless network.

In some examples of the method, the first wireless network and the second wireless network use different protocols. Further, the first wireless network and the second wireless network may use different channels or frequencies for a same protocol. In another example, the method further includes determining a value corresponding to the first wireless network based at least in part on the context of data use of the first wireless network by the wireless communications device, wherein determining the time delay is further based on the value.

In a second set of illustrative examples, an apparatus for wireless communication is described. In one configuration, the apparatus may include means for determining a context of data use of a first wireless network to which a wireless communications device is connected. The apparatus may also include means for determining a time delay associated with performing a switch from the first wireless network to a second wireless network when at least one performance indicator of the first wireless network is below a threshold performance level needed to support the context of data use. Further, the apparatus may include means for performing a switch from the first wireless network to the second wireless network in response to the time delay expiring while the at least one performance indicator remains below the threshold performance level.

In a third set of illustrative examples, a device for wireless communication is described. In one configuration, the device may include a data use detector to determine a context of data use of a first wireless network to which a wireless communications device is connected. The device may further include a time delay module to determine a time delay associated with performing a switch from the first wireless network to a second wireless network when at least one performance indicator of the first wireless network is below a threshold performance level needed to support the context of data use. Some examples of the device further include a switch manager to perform a switch from the first wireless network to the second wireless network in response to the time delay expiring while the at least one performance indicator remains below the threshold performance level.

In a fourth set of illustrative examples, a non-transitory computer-readable storage medium storing computer-executable code for wireless communication is described. In one configuration, the non-transitory computer-readable medium storing may include instructions executable by a processor to determine a context of data use of a first wireless network to which a wireless communications device is connected. The executable instructions may further cause the processor to determine a time delay associated with performing a switch when at least one performance indicator of the first wireless network is below a threshold performance level needed to support the context of data use. The executable instructions may also cause the processor to perform a switch to a second wireless network in response to the time delay expiring while the at least one performance indicator remains below the threshold performance level.

The foregoing has outlined rather broadly the features and technical advantages of examples according to the disclosure so that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
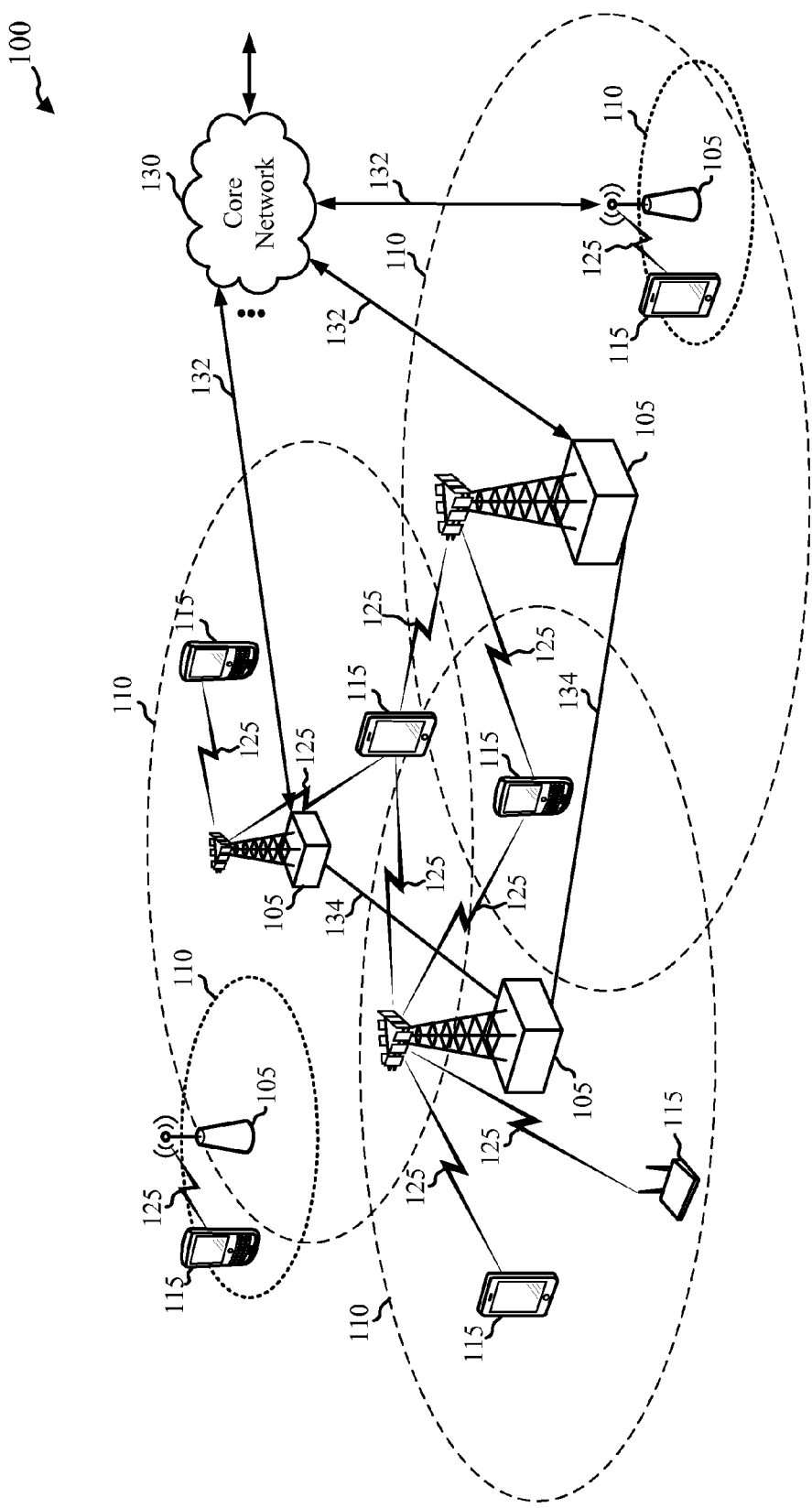
FIG. 1 shows a block diagram of a wireless communications system, in accordance with various aspects of the present disclosure.

A wireless communications device may attempt to stay connected to an established network connection (e.g., Wi-Fi) for data use until the signal strength of the network weakens or the signal under-performs. When the signal becomes weak or under-performs, the device may switch to another available connection (e.g., LTE) that has a better performance indicator (such as signal strength or quality). However, in conventional systems, as soon as the signal strength of the original network becomes stronger, the device may switch back to the original network. In some situations, the device may remain connected to the second network for only a few seconds before going back to the original network. For example, the device may be connected to Wi-Fi, switch to LTE, and then switch back to Wi-Fi. The switching of a device from an original network to another and then back to the original network within a short time period is referred to herein as a "ping-pong." A "short time" may be defined as a period of time during which this switch in networks is either not noticed by an end-user and/or does not affect the user experience of the device. User experience may not be affected if, for example, the use of the device is not interrupted or changed due to the switch. Ping-pongs may require greater power to perform than remaining on the original network, which may increase drain of a battery of a mobile device. Further, ping-pongs can result in increased data use than remaining on the original network, which may increase the cost of using the device.

Examples described herein determine when to perform switches based on at least one of a number of criteria. A switch, or handoff, refers to the process by which an ongoing data session of one channel of a network is transferred to another channel of the same network or to another network. For example, a wireless communications device may implement an algorithm to determine when to switch from a Wi-Fi connection to another available wireless connection with better signal strength (e.g., LTE) when the Wi-Fi signal strength is low. The algorithm may reduce the number of switches over conventional systems that automatically perform switches based on signal strength. These concepts can also be applied to switches between two Wi-Fi networks having different frequency ranges. The device may perform a switch when the described conditions are met, reducing the occurrence of switches, thereby potentially saving power and/or reducing data costs.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

FIG. 1 shows a block diagram of a wireless communications system 100, in accordance with various aspects of the present disclosure. For illustrative purposes, the wireless communications system 100 is described herein as including a LTE/LTE-A network. However, the wireless communications system 100 may include any type of network or more than one type of network, including wireless local area network (WLAN). The wireless communications system 100 includes base stations 105, wireless communications devices 115 (e.g., UEs or other mobile devices), and a core network 130. The core network 130 may provide user authentication, access authorization, tracking, Internet Protocol (IP) connectivity, and other access, routing, or mobility functions. The base stations 105 interface with the core network 130 through backhaul links 132 (e.g., S1, etc.) and may perform radio configuration and scheduling for communication with the UEs 115, or may operate under the control of a base station controller. In various examples, the base stations 105 may communicate, either directly or indirectly (e.g., through core network 130), with each other over backhaul links 134 (e.g., X1, etc.), which may be wired or wireless communication links.

The base stations 105 may wirelessly communicate with the UEs 115 via at least one base station antenna. Each of the base station 105 may provide communication coverage for a respective geographic coverage area 110. In some examples, base stations 105 may be referred to as a base transceiver station, a radio base station, an access point, a radio transceiver, a NodeB, eNodeB (eNB), Home NodeB, a Home eNodeB, or some other suitable terminology. In other examples, the base stations 105 may be access points, for example, and provide WLAN coverage. The geographic coverage area 110 for a base station 105 may be divided into sectors making up only a portion of the coverage area. The wireless communications system 100 may include base stations 105 of different types (e.g., macro and/or small cell base stations). There may be overlapping geographic coverage areas 110 for different technologies.

In some examples, the wireless communications system 100 is an LTE/LTE-A network. In LTE/LTE-A networks, the term evolved Node B (eNB) may be generally used to describe the base stations 105, while the term UE may be generally used to describe the UEs 115. The wireless communications system 100 may be a Heterogeneous LTE/LTE-A network in which different types of eNBs provide coverage for various geographical regions. For example, each eNB or base station 105 may provide communication coverage for a macro cell, a small cell, and/or other types of cell. The term "cell" is a 3GPP term that can be used to describe a base station, a carrier or component carrier associated with a base station, or a coverage area (e.g., sector, etc.) of a carrier or base station, depending on context.

The wireless communications system 100 may support synchronous or asynchronous operation. The techniques described herein may be used for either synchronous or asynchronous operations. The communication networks that may accommodate some of the various disclosed examples may be packet-based networks that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use Hybrid ARQ (HARQ) to provide retransmission at the MAC layer to improve link efficiency. In the control plane, the Radio Resource Control (RRC) protocol layer may provide establishment, configuration, and maintenance of an RRC connection between a UE 115 and the base stations 105 or core network 130 supporting radio bearers for the user plane data. At the Physical (PHY) layer, the transport channels may be mapped to Physical channels.

The UEs 115 are dispersed throughout the wireless communications system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communications device, a handheld device, a tablet computer, a laptop computer, a cordless phone, a wireless local loop (WLL) station, or the like. A UE may be able to communicate with various types of base stations and network equipment including macro eNBs, small cell eNBs, relay base stations, and the like.

The communication links 125 shown in wireless communications system 100 may include uplink (UL) transmissions from a UE 115 to a base station 105, and/or downlink (DL) transmissions, from a base station 105 to a UE 115. The downlink transmissions may also be called forward link transmissions while the uplink transmissions may also be called reverse link transmissions. Each communication link 125 may include at least one carrier, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. The communication links 125 may transmit bidirectional communications using frequency division duplexing (FDD) (e.g., using paired spectrum resources) or time division duplexing (TDD) operations (e.g., using unpaired spectrum resources). Frame structures for FDD (e.g., frame structure type 1) and TDD (e.g., frame structure type 2) may be defined.

In some embodiments of the wireless communications system 100, base stations 105 and/or UEs 115 may include multiple antennas for employing antenna diversity schemes to improve communication quality and reliability between base stations 105 and UEs 115. Additionally or alternatively, base stations 105 and/or UEs 115 may employ multiple-input, multiple-output (MIMO) techniques that may take advantage of multi-path environments to transmit multiple spatial layers carrying the same or different coded data.

Wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and at least one uplink CC for carrier aggregation. Carrier aggregation may be used with both FDD and TDD component carriers.

Occasionally a UE 115 may experience decreased signal strength of a network to which the UE 115 is connected. For example, the UE 115 may be connected to a base station 105 and determine there is a reduced performance quality (such as signal strength or signal quality) of the connection. The signal strength or quality may be poor for the UE 115 due to at least one of many factors, including distance from the base station 105, interference, being located within a building or other structure that is obstructing signals, and geographical features causing dead zones. When the signal becomes weak or under-performs, the UE 115 may determine whether to perform a switch to another available channel or network.

For example, if the UE 115 is at an edge of a geographic coverage area 110 of a base station 105, it may experience a weak or under-performing signal. If the UE 115 also happens to be within another geographic coverage area 110 of another base station 105 and the UE 115 receives a greater signal strength from that base station 105, the UE 115 may be able to handoff communications to that base station 105. In order to determine whether the UE 115 should perform a switch when the signal strength is weak or under-performs, the UE 115 may determine if the UE 115 has any current data use of the network. If not, the UE 115 may refrain from performing a switch in order to, for example, conserve power or reduce costs. If the UE 115 is using data on the network, the UE 115 may determine a context of the data use. The UE 115 may also determine a time delay based on the context of data use. When the time delay expires and the signal strength remains weak or under-performing, the UE 115 may perform a switch to another base station 105 or other network connection.

Figure 2:
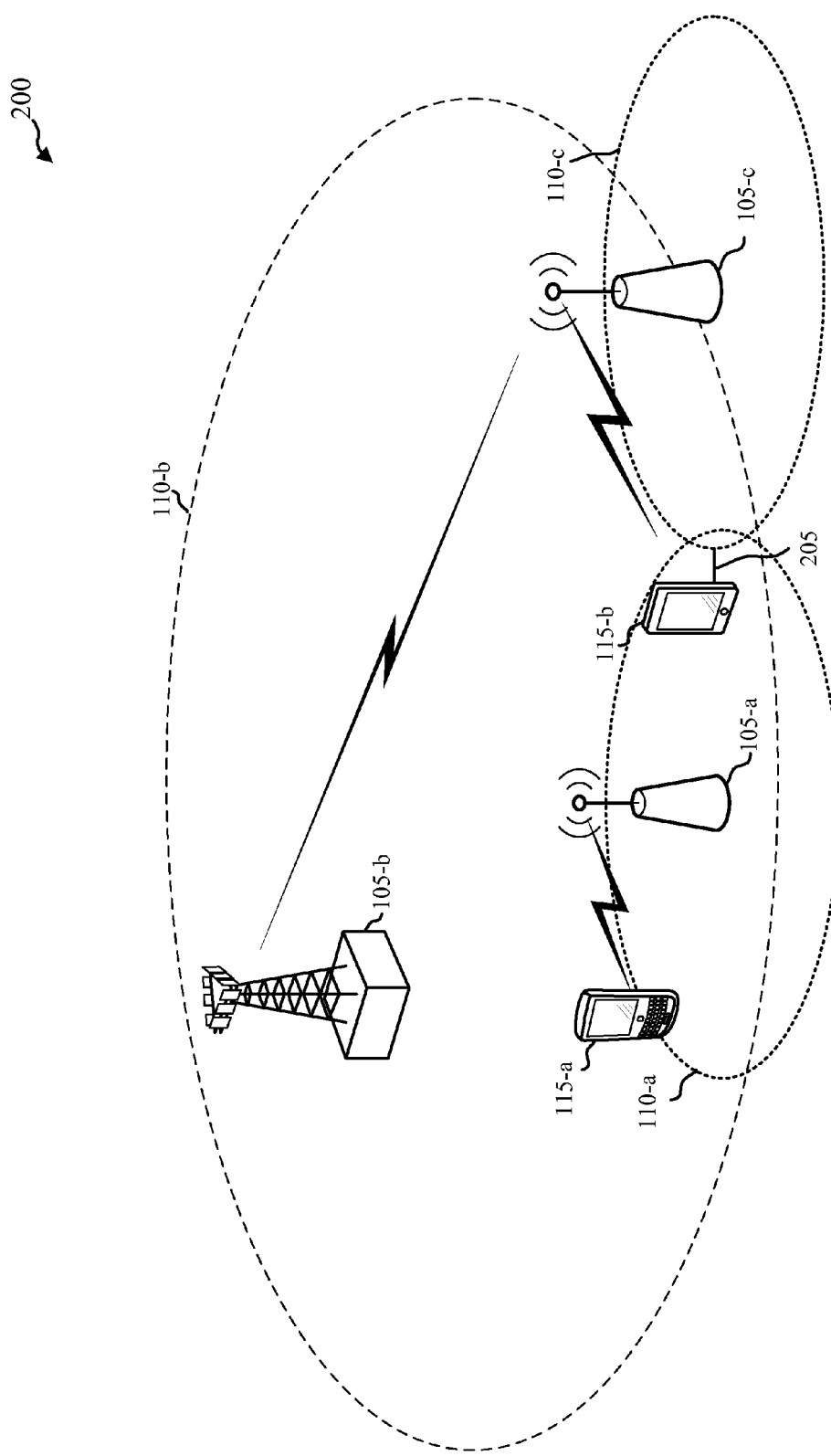
FIG. 2 shows an isometric view diagram of an example wireless communications system, in accordance with various aspects of the present disclosure.

FIG. 2 shows an isometric view diagram of an example wireless communications system, in accordance with various aspects of the present disclosure. The wireless communications system 200 includes a first wireless communications device 115-a (e.g., UE 115-a) covered by a first access point 105-a and a base station 105-b. In this example, the first access point 105-a and the base station 105-b are illustrated as Wi-Fi access points and will be referred to herein as access points. In other examples, at least one of the stations 105-a, 105-b, and 105-c are access points or base stations. In the example shown, the wireless communications system 200 further includes a second wireless communications device 115-b (e.g., UE 115-b) that is covered by the first access point 105-a, the second access point 105-c, and a base station 105-b. The base stations 105 may communicate with the UEs 115 under the control of a base station controller, which may be part of a core network (such as core network 130 of FIG. 1) or the base stations 105 in various embodiments. Base stations 105 may communicate control information and/or user data with the core network through at least one backhaul link (such as backhaul links 132 of FIG. 1). The backhaul links may be wired and/or wireless communication links. In some embodiments, the base stations 105 may communicate, either directly or indirectly, with each other over backhaul links, which may be wired or wireless communication links. In some examples, the wireless communications devices 115-a and 115-b may be examples of aspects of at least one of the UEs 115 described with reference to FIG. 1. In some examples, the base stations 105-a, 105-b, and 105-c may be examples of aspects of at least one of the base stations 105 described with reference to FIG. 1.

The first access point 105-a has a first geographic coverage area 110-a, the base station 105-b has a second geographic coverage area 110-b, and the second access point 105-c has a third geographic coverage area 110-c. As shown in FIG. 2, the first UE 115-a is within two coverage areas: the first geographic coverage area 110-a corresponding to the first access point 105-a and the second geographic coverage area 110-b corresponding to the base station 105-b. It may be possible for the first UE 115-a to connect to either of the first access point 105-a and the base station 105-b. The first UE 115-a may handoff from the first access point 105-a to the base station 105-b, or vice-versa, if the first UE 115-a determines an appropriate switch condition exists. For example, the first UE 115-a may be connected to the first access point 105-a and determine that the signal strength or other parameter of the connection to the first access point 105-a is inadequate. The first UE 115-a may decide to perform a switch to the base station 105-b or stay connected to the first access point 105-a based on at least one factor. The factors may include, for example, a frequency of data use, how long it has been since data has been used, a context of data use, a value based on the context of data use, an available buffer, a time delay, a location of the first UE 115-a with respect to the base station, a known travel pattern, and combinations thereof.

Further shown in FIG. 2 is the second UE 115-b is close to but not within the third geographic coverage area 110-c corresponding to the second access point 105-c and within the first geographic coverage area 110-a corresponding to the first access point 105-a and the second geographic coverage area 110-b corresponding to the base station 105-b. The second UE 115-b may be a distance 205 away from the third geographic coverage area 110-c of the second access point 105-c. The second UE 115-b may be within a geographical boundary defined for the second access point 105-c. However, the second UE 115-b may be (e.g., with a very weak or poorly performing signal), or previously was, connected to the second access point 105-c. It may be possible for the second UE 115-b to connect to either the first access point 105-a or the base station 105-b. The second UE 115-b may handoff from the second access point 105-c to the base station 105-b, if the second UE 115-b determines an appropriate switch condition exists for the second access point 105-c. Even though the second UE 115-b may not be receiving a strong signal or any signal at all from the second access point 105-c, the second UE 115-b may not perform a switch to one of the other base stations 105 if there is currently no data being used, a context of data use indicates a switch is not needed, some data in a buffer is still available, a delay time period has not yet expired, or combinations thereof. For example, the second device UE 115-b may not switch to another network if previously determined patterns indicate that the second device UE 115-b may return to geographic coverage area 110-c before data will be used or a buffer runs out. In some examples, the second UE 115-b may base a decision of whether to switch to another network on the distance 205 compared to a proximity threshold or the distance 205 being within a pattern of travel of the second UE 115-b.

A wireless communications device, such as a UE 115, may determine an improved time to perform a switch based on a number of factors, including a use and context of a data exchange. By intelligently selecting when to perform a switch and when to maintain the previous connection, the wireless communications device may save battery power and incur less data use fees.

Figure 3:
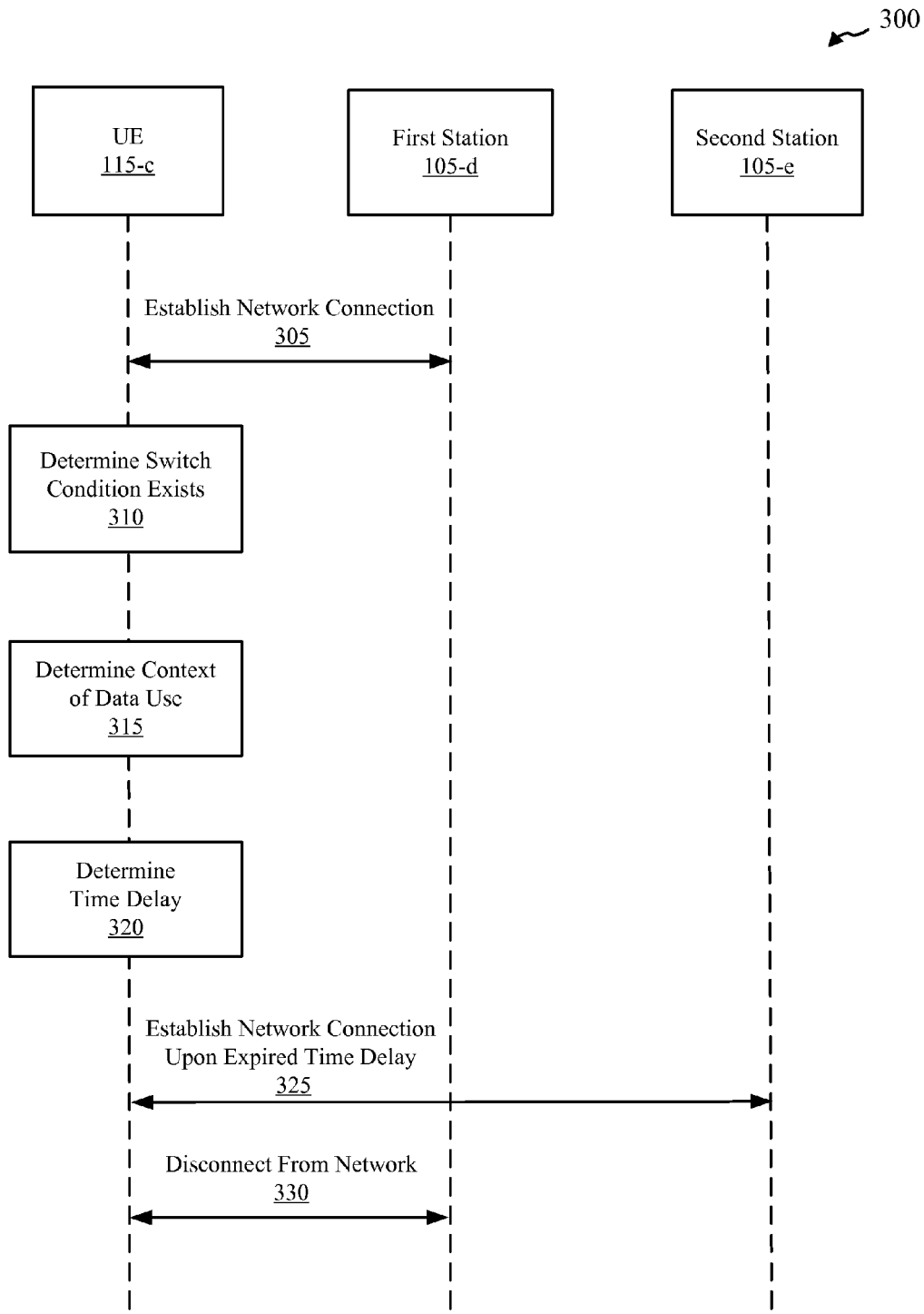
FIG. 3 shows a flow diagram of an example process of performing a switch, in accordance with various aspects of the present disclosure.

FIG. 3 shows a message flow diagram 300 of an example process of performing a switch, in accordance with various aspects of the present disclosure. The message flow diagram 300 illustrates example communications between a wireless communications device 115-c (e.g., a UE 115-c), a first station 105-d, and a second station 105-e. In some examples, the wireless communications device 115-c may be an example of aspects of at least one of the UEs 115 described with reference to FIGS. 1 and/or 2. In some examples, the first station 105-d and/or the second station 105-e may be examples of aspects of at least one of the base stations 105 described with reference to FIGS. 1 and/or 2.

In this example, the UE 115-c may establish a communication session with the first station 105-d. The UE 115-c may initially connect to the first station 105-d as opposed to the second station 105-e for a variety of reasons, such as, for example, the UE 115-c is closer to the first station 105-d than to the second station 105-e; the UE 115-c may have a configuration setting to prefer connecting to a particular type of network (e.g., Wi-Fi) whenever that type of network is available; the UE 115-c receives a signal that has at least one performance indicator (e.g., signal strength, etc.) preferable over the second station 105-d; and the first station 105-c may be of a private or home network (e.g., a Wi-Fi network) and the second station 105-d may be of a cell network (e.g., LTE).

In order to establish a communication session with the first station 105-d, the UE 115-c may transmit an initial communications message 305 to establish a network connection with the first station 105-d. The first station 105-d may respond in kind with at least one resource to establish a communication session. Data may, or may not, be exchanged between the UE 115-c and the first station 105-d at any given time during the communication session.

At some point during the communication session, the UE 115-c may determine that a switch condition exists at block 310. A switch condition may exist when a signal strength and/or performance of the communication session becomes weaker and/or less than a threshold value. In some examples, a switch condition may be detected when at least one performance indicator of the communication session is below a threshold performance level needed to support a context of data use of the communication session.

Before performing a switch to the second station 105-e, the UE 115-c may determine a context of data use at block 315. The UE 115-c may determine that there is no data being exchanged when the switch condition occurs. If there is no data being exchanged with the first station 105-d, there may be no reason for the UE 115-c to perform a switch at that time. Further, if no data has been exchanged for a predetermined time period since before or while the switch condition occurred, the UE 115-c may also decide not to perform a switch. However, if there is data use between the UE 115-c and the first station 105-d, the UE 115-c may determine the context of the data use. In some examples, the context of the data use may be what type of data is being exchanged. For example, the context of the data use may be real-time content (e.g., a voice over Internet protocol (VoIP) call), streaming content (e.g., a streaming video that has a buffer of content on the UE 115-c), intermittent data needs (e.g., an email client intermittently sending and receiving email), or no data exchanged.

Based at least in part on the context of the data, the UE 115-c may determine a time delay for performing a switch. The UE 115-c may assign the time delay based on the context of the data use, and begin to count down the time delay responsive to detecting the switch condition. The UE 115-c may perform a switch to the second station 105-e once the time delay expires and the switch condition still exists. In order to establish the switch, the UE 115-c may send a message 325 to the second station 105-e in order establish a communication session. The second station 105-e may respond in kind with at least one resource to establish a communication session with the UE 115-c.

The UE 115-c may send a message 330 to the first station 105-d in order to disconnect from the network of the first station 105-d. In some examples, the UE 115-c does not send the message 330. In other examples, the UE 115-c disconnects from the first station 105-d before establishing the communication session with the second station 105-e.

Figure 4:
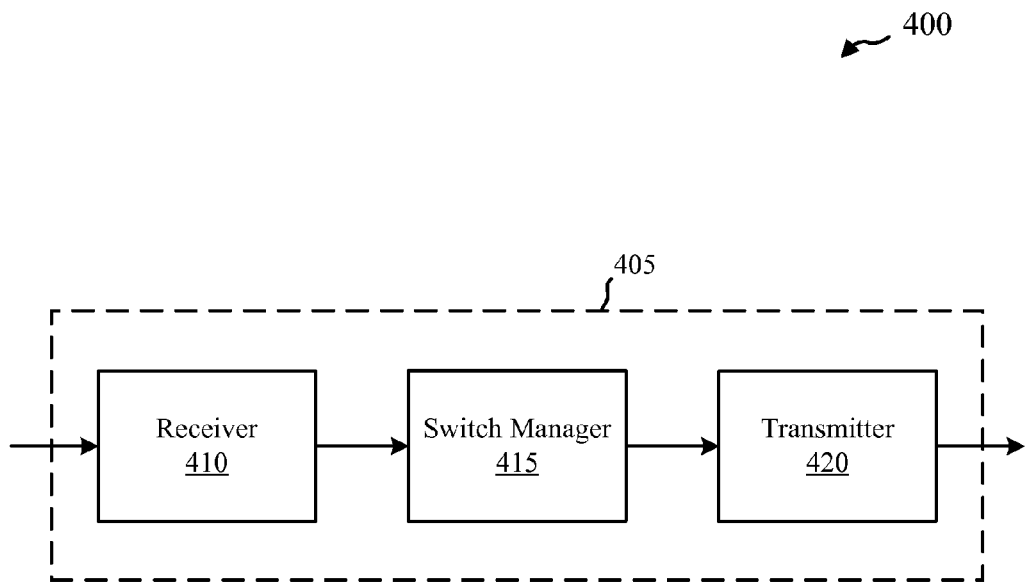
FIG. 4 shows a block diagram of an example of an apparatus for use in wireless communication, in accordance with various aspects of the present disclosure.

FIG. 4 shows a block diagram 400 of an example of an apparatus 405 for use in wireless communication, in accordance with various aspects of the present disclosure. In some examples, the apparatus 405 may be configured as a UE or other wireless communications device and be an example of aspects of one or more of the UEs 115 described with reference to any of FIGS. 1-3. The apparatus 405 may also be a processor. The apparatus 405 may include a receiver 410, a switch manager 415, and/or a transmitter 420. Each of these components may be in communication with each other.

The components of the apparatus 405 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

In some examples, the receiver 410 may include at least one radio frequency (RF) receiver, such as at least one RF receiver operable to receive transmissions over a radio frequency spectrum. In some examples, the radio frequency spectrum may be used for LTE/LTE-A and WLAN communications, as described, for example, with reference to any of FIGS. 1-3. The receiver 410 may be used to receive various types of data and/or control signals (i.e., transmissions) over one or more communication links of a wireless communications system, such as one or more communication links 125 of the wireless communications system 100 and/or 200 described with reference to FIGS. 1 and/or 2, respectively. Examples of the types of data and/or control signals received by the receiver 410 include the granting of resources via either PDSCH and PUSCH. The receiver 410 may receive a messages and resources to establish a communication session, such as messages 305 and 325 of FIG. 4. The receiver 410 may also receive data from a station, such as a station 105 as described, for example, with reference to any of FIGS. 1-3, during a communication session with the station. For example, the receiver 410 may receive streaming or real-time content.

In some examples, the transmitter 420 may include at least one RF transmitter, such as at least one RF transmitter operable to transmit discovery messages. The transmitter 420 may be used to transmit various types of data and/or control signals (i.e., transmissions) over one or more communication links of a wireless communications system, such as one or more communication links 125 of the wireless communications system 100 and/or 200 described with reference to FIGS. 1 and/or 2, respectively. The transmitter 420 may also transmit data to a station, such as a station 105 as described, for example, with reference to any of FIGS. 1-3, during a communication session with the station. For example, the transmitter 420 may transmit streaming or real-time content.

The switch manager 415 may use the data received at receiver 410 to perform analysis and/or take measurements to determine any change in performance indicators of a communication session, such as signal strength or quality and/or signal throughput quality (e.g., bandwidth, lag, jitter, etc.). Based on the analysis and/or measurements, the switch manager 415 may determine that a switch condition exists. A switch condition may exist, for example, when the signal from the station 105 becomes weaker than a threshold level and/or when the signal from the station 105 performs under a threshold level, such as when the apparatus 405 is in a dead zone, enters an elevator, or is at an edge of a coverage area of the station, such as geographic coverage areas 110 described with reference to FIGS. 1 and/or 2.

The switch manager 415 may determine if and when to perform a switch based at least in part on a context of data use. If the apparatus 405 is not exchanging data with a station or only has intermittent data needs, the switch manager 415 may not perform a switch. If the apparatus 405, however, does have data use of the network while the switch condition exists, the apparatus 405 may perform a switch once a determined time delay has expired for the particular context of data use.

Figure 5:
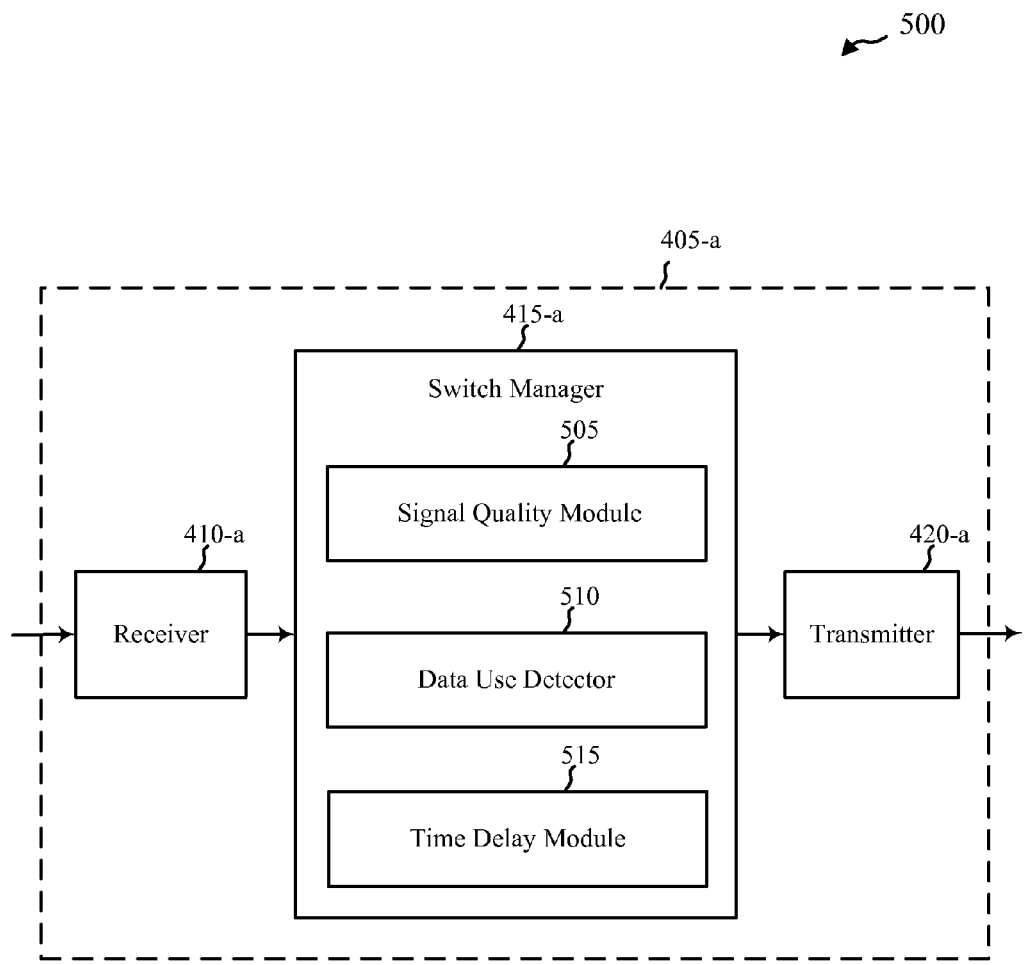
FIG. 5 shows a block diagram of another example of a wireless communications device for use in wireless communication, in accordance with various aspects of the present disclosure.

FIG. 5 shows a block diagram of another example of an apparatus 405-a for use in wireless communication, in accordance with various aspects of the present disclosure. The apparatus 405-a may be an example of aspects of the apparatus 405 (of FIG. 4). In some examples, the apparatus 405-a may include a receiver 410-a and a transmitter 420-a that may be examples of the receiver 410 and the transmitter 420, respectively, described with reference to FIG. 4. In additional examples, the apparatus 405-a may include a switch manager 415-a, which may be an example of aspects of the switch manager 415 described with reference to FIG. 4. In some examples, the apparatus 405-a may be configured as a UE or other wireless communications device and be an example of aspects of one or more of the UEs 115 described with reference to any of FIGS. 1-3. The apparatus 405-a may also be a processor. Each of the components of the apparatus 405-a may be in communication with each other.

In some examples, the switch manager 415-a may include a signal quality module 505, a data use detector 510, and/or a time delay module 515. While FIG. 5 illustrates specific examples of the functions performed by each of the modules 505, 510, and 515, the functions performed by each of the modules 505, 510, and 515 may in some cases be combined, divided, or implemented using one or more other modules.

In some examples, the signal quality module 505 may be used to receive (e.g., via the receiver 410-a) one or more signals detected at the apparatus 405-a. The signal quality module 505 may take measurements of the received signals to determine a performance of the network. The signal quality module 505 may determine when at least one performance indicator of the wireless network to which the apparatus 405-a is connected falls below a threshold performance level.

The data use detector 510 may determine an amount, frequency, and/or context of data use of the network connection. The apparatus 405-a may determine what type of data content is being used, whether there are intermittent data needs, or whether no application is using data, for example.

Based on the amount, frequency, and/or context of data use, the time delay module 515 may determine a time delay to wait before the switch manager 415-a performs a switch to another network connection. For example, if the context of data use is a real-time content, such as VoIP, the time delay module 515 may set the time delay to zero in order to maintain the real-time data transfer. When the switch manager 415-a determines the network the apparatus 405-a is connected to has, for example, a weak and/or under-performing signal, and the data use is a real-time content, the switch manager 415-a may immediately perform a switch to a connection with a strong signal in order to maintain the real-time content. This immediate switch may provide a user of the apparatus 405-a with an uninterrupted user experience. In another example, if the data use is only an intermittent data need, such as an email application that occasionally sends/receives email, a blog application that intermittently receives new articles, a social network application that intermittently sends/receives new posts, or the like, the time delay module 515 may set a predetermined time delay. For example, the predetermined time delay may be some number of minutes.

In some examples, a user action on the apparatus 405-a, such as hitting a refresh or send option, may override the time delay. In such a case, the time delay module 515 may set the time delay to zero. The time delay module 515 may also update the predetermined time delay if the context of data use changes. For example, if there was previously only intermittent data use when the switch condition occurred, and then the apparatus 405-a established a VoIP call during the predetermined time delay for the intermittent data use, the time delay module 515 may update the time delay to reflect the change in data use. In this example, the time delay module 515 may set the time delay to zero. When the time delay is set to zero, the switch manager 415-a performs a switch to another available network that meets the performance threshold.

Figure 6:
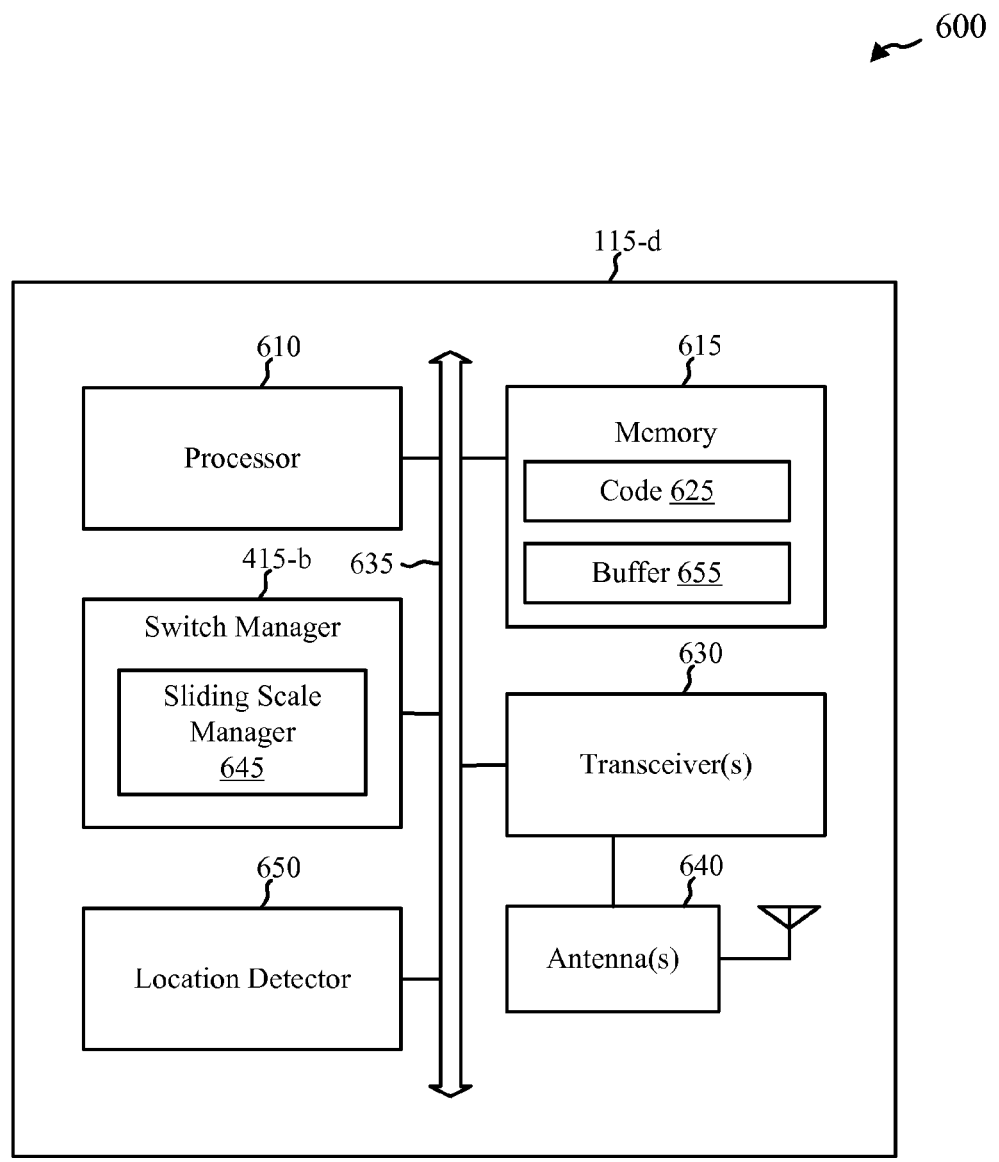
FIG. 6 shows a block diagram of another example of an apparatus for use in wireless communication, in accordance with various aspects of the present disclosure.

FIG. 6 shows a block diagram 600 of another example of a wireless communications device 115-d for use in wireless communication, in accordance with various aspects of the present disclosure. In this example, the wireless communications device can be a UE. The UE 115-*d* may have various configurations and may be or be part of a personal computer (e.g., a laptop computer, a netbook computer, a tablet computer, etc.), a cellular telephone, a PDA, a digital video recorder (DVR), an internet appliance, a gaming console, an e-reader, or the like. The UE 115-*d* may, in some examples, have an internal power supply, such as a small battery, to facilitate mobile operation. In some examples, the UE 115-*d* may be an example of aspects of one or more of the UEs 115 described with reference to any of FIGS. 1-3 and/or aspects of one or more of the apparatuses 405 described with reference to FIGS. 4 and/or 5. The UE 115-*d* may implement at least some of the UE and/or apparatus features and functions described with reference to any of FIGS. 1-5.

The UE 115-*d* may include a processor 610, a memory 615, at least one transceiver (represented by transceiver(s) 630), at least one antenna (represented by antenna(s) 640), and/or a switch manager 415-*b*. Each of these components may be in communication with each other, directly or indirectly, over one or more buses 635.

The memory 615 may include random access memory (RAM) and/or read-only memory (ROM). The memory 615 may store computer-readable, computer-executable code 625 containing instructions that are configured to, when executed, cause the processor 610 to perform various functions described herein related to wireless communication and/or PCI collision detection. Alternatively, the code 625 may not be directly executable by the processor 610 but be configured to cause the UE 115-*d* (e.g., when compiled and executed) to perform one or more of the functions described herein.

The processor 610 may include an intelligent hardware device, e.g., a CPU, a microcontroller, an ASIC, or the like. The processor 610 may process information received through the transceiver(s) 630 and/or information to be sent to the transceiver(s) 630 for transmission through the UE antenna(s) 640. The processor 610 may handle, alone or in connection with the switch manager 415-*b*, various aspects of communicating over (or managing communications over) a radio frequency spectrum.

The transceiver(s) 630 may include a modem configured to modulate packets and provide the modulated packets to the antenna(s) 640 for transmission, and to demodulate packets received from the antenna(s) 640. The transceiver(s) 630 may, in some examples, be implemented as one or more transmitters and one or more separate receivers. The transceiver(s) 630 may support wireless communication using one or more radio access technologies. The transceiver(s) 630 may be configured to communicate bi-directionally, via the antenna(s) 640, with one or more of the base stations 105 described with reference to any of FIGS. 1-3. While the UE 115-*d* may include a single antenna, there may be examples in which the UE 115-*d* may include multiple antennas 640.

The switch manager 415-*b* may be configured to perform and/or manage some or all of the features and/or functions described with reference to any of FIGS. 1-5 related to performing switches based at least in part on a frequency, amount, and/or context of data use. The switch manager 415-*b*, or portions of it, may include a processor, and/or some or all of the functions of the switch manager 415-*b* may be performed by the processor 610 and/or in connection with the processor 610. In some examples, the switch manager 415-*b* may be an example of the switch manager 415 described with reference to FIGS. 4 and/or 5.

The switch manager 415-*b* may include a sliding scale manager 645. The sliding scale manager 645 may set a sliding scale for a switch to be performed based on the current applications that are in use at the UE 115-*d*. The sliding scale manager 645 may determine a value based on the frequency, amount, and/or context of data use. This value may be set on a sliding scale that the switch manager 415-*b* may use to determine when to perform a switch (e.g., switch to LTE when the Wi-Fi signal is under-performing and the time delay is expired). The sliding scale manager 645 may determine the value using an algorithm based on the current applications in use at the UE 115-*d*. The scale value may decide the time delay for a switch to another available network.

For example, if the data used is real-time content (e.g., VoIP/VT), the sliding scale manager 645 may set the value of the scale to zero. The sliding scale manager 645 may also set the value of the sliding scale to a maximum value when no applications of the UE 115 are using data. The sliding scale manager 645 may fine-tune the value based on current network conditions. The context of the wireless communications device or a station (such as a base station or router) may also affect the value on the sliding scale. For example, the sliding scale value may be adjusted based on a Wi-Fi capability of the UE 115 (a/b/g/n/ac), the current authenticated Wi-Fi (e.g., home, work, etc.), the frequency and protocol of the wireless connection (e.g. LTE on 700 MHz, CDMA on 1900 MHz, Wi-Fi B on 2 GHz, Wi-Fi 33 N on 5 GHz, etc.), and a reliability of the Wi-Fi network over time. Thus, the UE 115 may use these additional factors to determine when to perform a switch.

In another example where the data use is streaming content (e.g., audio-only, video-only, video and audio, etc.), the sliding scale manager 645 may set the value of the scale to a time duration that is less than a buffer size. That is, when a buffer, for example, the buffer 655, is used for streaming content, the switch manager 415-*b* may delay a switch while there is still sufficient content in the buffer 655. In one example, the UE 115 may increase a buffer size of storing future data when connected to Wi-Fi to try to prevent a ping-pong. In one example, the switch manager 415-*b* checks a buffer size. If the buffer is going to be exhausted soon and the switch condition still exists, the switch manager 415-*b* may perform a switch. For example, if the buffer has 40 seconds of content when the switch manager 415-*b* checks the buffer, the switch manager 415-*b* may wait until the buffer is nearly exhausted, e.g., has 10 seconds left, to perform a switch. That is, the switch manager 415-*b* triggers a switch to the second wireless connection with time enough left in the buffer to establish the second network connection without loss of service. In some examples, the switch manager 415-*b* uses a learning algorithm to improve the accuracy of a buffer size to be used and how much of the buffer to exhaust before performing a switch to another network.

The UE 115-*d* may also include a location detector 650 that determines a location of the UE 115-*d*. The location detector 650 may be, for example, a global navigation satellite system (GNSS) receiver, cellular receiver, Wi-Fi receiver, Bluetooth device, or the like. In other examples, the location detector 650 may be a location service that may use data from various receivers and sensors (e.g., accelerometers, gyrometers, magnetometer, etc.). The location detector 650 may provide the switch manager 415-*b* with information related to a current location of the UE 115-*d*. The switch manager 415-*b* may use the location of the UE 115-*d* in determining if and when to perform a switch with respect to the quality of the network in the area that UE 115-*d* located.

Figure 7:
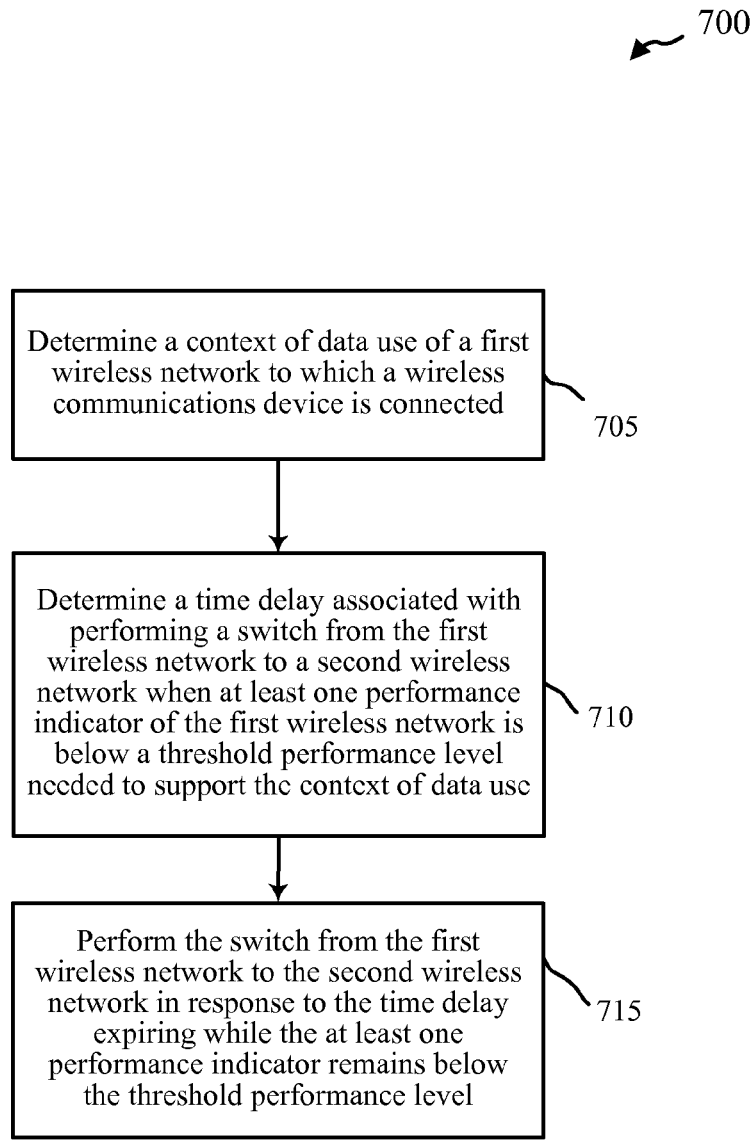
FIG. 7 is a flowchart of a method for wireless communication, in accordance with various aspects of the present disclosure.

FIG. 7 is a flowchart of a method 700 for wireless communication, in accordance with various aspects of the present disclosure. For clarity, the method 700 may apply to aspects of one or more of the UEs 115 described with reference to any of FIGS. 1-3, and/or 6, and/or aspects of one or more of the apparatuses 405 as described with reference to FIGS. 4 and/or 5. In some examples, a UE or apparatus may execute one or more sets of codes to control the functional elements of the UE or apparatus to perform the functions described below.

At block 705, the method 700 may include determining a context of data use of a first wireless network to which a wireless communications device is connected. The operation(s) at block 705 may be performed using the switch manager 415 described with reference to any of FIGS. 4-6. In some examples, determining a context of data use may further include determining at least one of an amount and frequency of data use. The method 700 may determine the data use to be intermittent, that no application is using data, that there is streaming content being used, or that there is real-time content being used, for example.

At block 710, the method 700 may include determining a time delay associated with performing a switch from the first wireless network to a second wireless network when at least one performance indicator of the first wireless network is below a threshold performance level needed to support the context of data use. The operation(s) at block 710 may be performed using the switch manager 415 described with reference to any of FIGS. 4-6. In some examples, setting the time delay includes setting the time delay to zero responsive to the context of the data use being a real-time data use. In another example, the time delay is set to a first time period that is less than a buffer size time period responsive to the context of the data use being a streaming content data use. In yet another example, the time delay is set to a second time period responsive to the context of the data use being an intermittent data use. In a further example, the time delay is set to a third time period longer than the second time period responsive to the context of the data use being no data use for a fourth time period.

At block 715, the method 700 may include performing the switch from the first wireless network to the second wireless network in response to the time delay expiring while the at least one performance indicator remains below the threshold performance level. The operation(s) at block 715 may be performed using the switch manager 415 described with reference to any of FIGS. 4-6. In some examples, the first wireless network and the second wireless network use different protocols. In other examples, the first wireless network and the second wireless network use different channels of a same protocol. In some examples, the method 700 includes maintaining the connection to the first wireless network based at least in part on the determined amount or frequency of data use.

In some examples, the method 700 may also include determining a value corresponding to the first wireless network based at least in part on the context of data use of the first wireless network by the wireless communications device. The switch manager 415 described with reference to any of FIGS. 4-6, particularly the sliding scale manager 645 described with reference to FIG. 6, may determine the value. In some examples, the sliding scale manager 645 creates a sliding scale for switching to another network device based at least in part on the context of data use, such as what current applications are being used on the UE 115.

In other examples, the method 700 may include determining a geographical location of the wireless communications device. The method 700 may include adjusting the time delay responsive to the wireless communications device being located within proximity of the first wireless network. For example, if the wireless communications device is within a threshold distance of the first wireless network, the time delay may be lengthened. The duration the time delay may be lengthened may be based on how far the wireless communications device is from a coverage area of the first wireless network.

Further, the method 700 may include determining a previous pattern of travel of the wireless communications device within a predetermined distance of the first wireless network. For example, the UE 115 may determine that a user tends to carry the UE 115 out of the user's home into a corner of the backyard that extends beyond a home Wi-Fi coverage area but returns quickly to the Wi-Fi coverage area. Once the UE 115 has detected a previous pattern of travel, if the UE 115 determines, based on a location of the UE 115, that it is likely going to return to the Wi-Fi coverage area soon, the UE 115 may not perform a switch. In some examples, the method 700 further includes adjusting the time delay based at least in part on the previous pattern of travel. Thus, if the previous pattern indicates that the UE 115 typically returns to the Wi-Fi coverage area within 5 minutes, the method 700 may include adjusting the time delay by 5 minutes. That is, the method 700 may include adjusting the time delay to a first time period if the previous pattern of travel of the wireless communications device indicates the wireless communications device will return or remain within proximity within the first time period.

The method 700 may also include determining a switch condition exists. The switch condition may be determined based on the at least one performance indicator. In some examples, the at least one performance indicator is at least one of a signal strength of the first wireless network, or a signal quality of the first wireless network (e.g., bandwidth, jitter, lag, etc.), or a profile of the first wireless network (as defined below), or a combination thereof. The at least one quality indicator may be at least one of a signal strength of the first wireless network, a signal quality of the first wireless network, and a profile of the first wireless network.

In some examples, the UE 115 may ping-pong back to the first wireless network. In such an example, the method 700 may include determining the at least one performance indicator is above the threshold performance level for the first wireless network. For example, the UE 115 may have returned to a location with a better signal strength. For example, the UE 115 moved from a building with Wi-Fi to outside where the Wi-Fi did not extend, so the UE 115 performed a switch to LTE based on the methods described herein. In this example, the UE 115 may have returned to the building with Wi-Fi and performs a switch back to the Wi-Fi. The method 700 may include performing a switch back to the first wireless network responsive to the at least one performance indicator being above the threshold performance level and based at least in part on a context of data use of the second wireless network.

In yet another example, the method 700 may include building a profile of a Wi-Fi capability of the UE 115 (for example, a/b/g/n/ac/ad etc.). The method 700 may also include building a profile for current authenticated Wi-Fi networks (e.g., work, home, coffee shop, airport, etc.). The UE 115 may use the profiles to determine when to perform switches.

Figure 8:
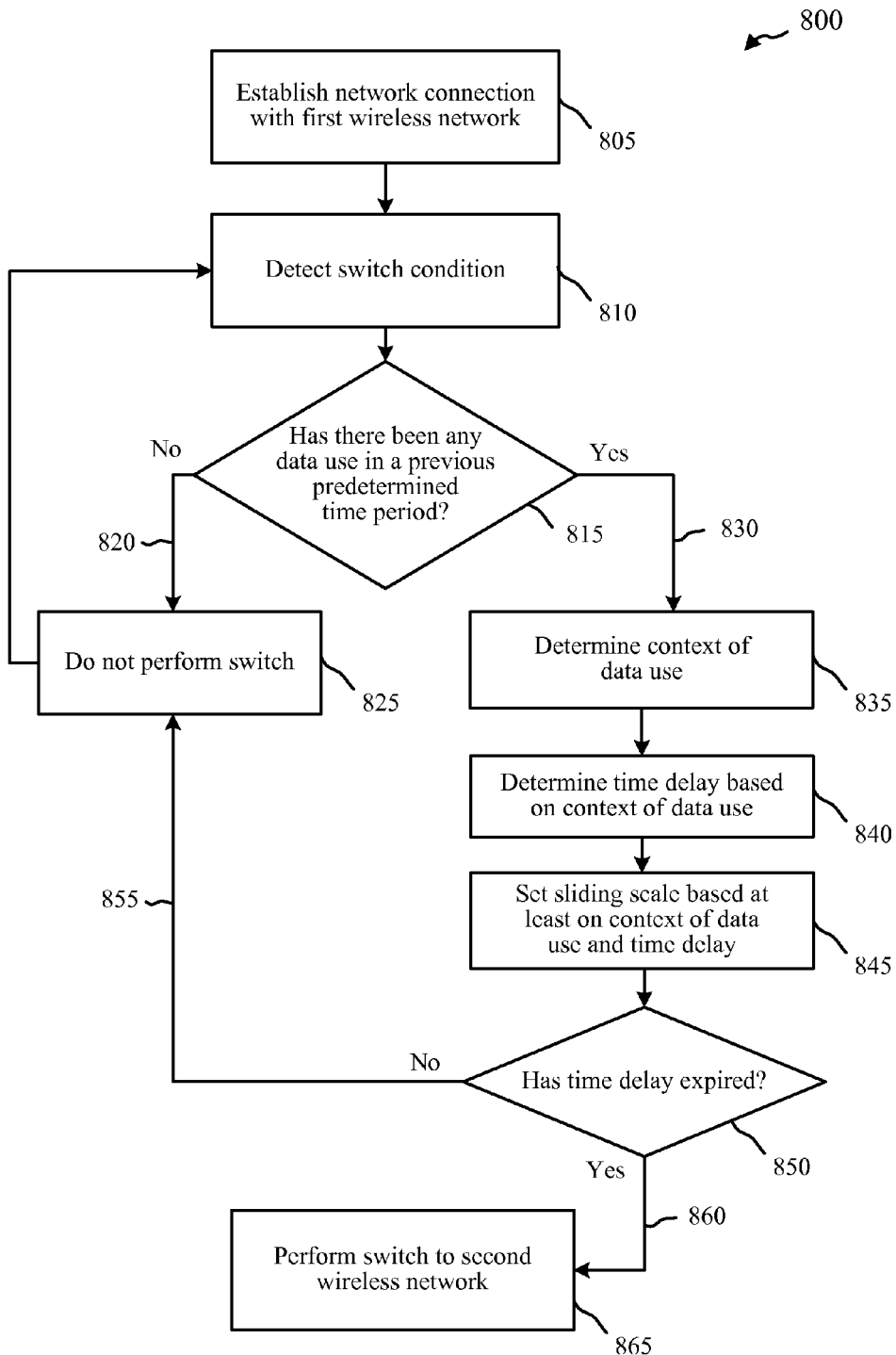
FIG. 8 is a flowchart of a method for performing a switch according to a context and use of a wireless network, in accordance with various aspects of the present disclosure.

FIG. 8 is a flowchart of a method 800 for performing a switch according to a context and use of a wireless network, in accordance with various aspects of the present disclosure. For clarity, the method 800 may apply to aspects of one or more of the UEs 115 described with reference to any of FIGS. 1-3, and/or 6, and/or aspects of one or more of the apparatuses 405 as described with reference to FIGS. 4 and/or 5. In some examples, a UE or apparatus may execute one or more sets of codes to control the functional elements of the UE or apparatus to perform the functions described below.

At block 805, the method 800 includes establishing a network connection with a first wireless network. For illustrative purposes only, the first wireless network will be discussed as a Wi-Fi network. The network connection may establish a communication session between a UE 115 and a base station 105 as described with reference to any of FIGS. 1-3. At some point during the communication session, the UE 115 detects a switch condition at block 810. The switch condition may be based on a performance indicator of the wireless network being below a threshold level.

Responsive to detecting the switch condition, the UE 115 may determine if there has been any data use on the first wireless network for a predetermined time period at block 815. For example, the predetermined time period may be any amount of minutes. For example, the predetermined time period is up to ten minutes. If there has not been any data use in the last predetermined time period, the method 800 proceeds along path 820 to block 825. For example, the method 800 may proceed to block 825 and not perform a switch if there has been little or intermittent data use during the last predetermined time period. At block 825, the method 800 includes not performing a switch. That is, the UE 115 will not perform a switch when there has been no data activity for some amount of time. If the method 800 does not perform a switch, the method may continue to monitor for switch conditions at block 810.

If there has been data use in the previous time period, the method 800 proceeds along path 830 to block 835. At block 835, the method 800 includes determining a context of the data use. The context of the data use may be, for example, streaming content, real-time content, or intermittent data use. Once the context of the data use is determined, at block 840, the method 800 may include determining a time delay before the switch is performed based on the context of data use.

At block 845, the method 800 may include setting a value of a sliding scale based at least in part on the context of the data use and the time delay. For example, the UE 115 may set a value on a sliding scale and switch from one wireless connection to another based on the value. The value may be set based on one or more factors, such as a current use of the device, the current signal strength, geographic location, use and movement patterns of the user, available connections, etc. The UE 115 may switch connections and take different actions based on the value, or switch when the value is below a threshold value.

At block 850, the method 800 may determine if the time delay has expired. If the time delay has not expired, the method 800 proceeds along path 855 to block 825 and refrains from performing a switch. In some examples, the method 800 may return to block 850 to determine again whether the time delay has expired. In some examples, the method 800 includes automatically performing a switch when the time delay expires. If the time delay has expired, the method 800 proceeds along path 860 to block 865. At block 865, the method 800 may include performing a switch to a second wireless network. In other examples, the method 800 first determines whether the switch condition still exists when the time delay expires before performing the switch.

In further examples, the method 800 may be repeated similarly for performing a switch from the second wireless network to the first wireless network. In some examples, a priority level may be assigned to the different available networks. The value on the sliding scale may be adjusted based on the priority level. For example, the UE 115 may switch to a preferred network (such as a home or business Wi-Fi network) more quickly than the UE 115 would switch to a less preferred network (such as an LTE network that incurs fees for data use).

Figure 9:
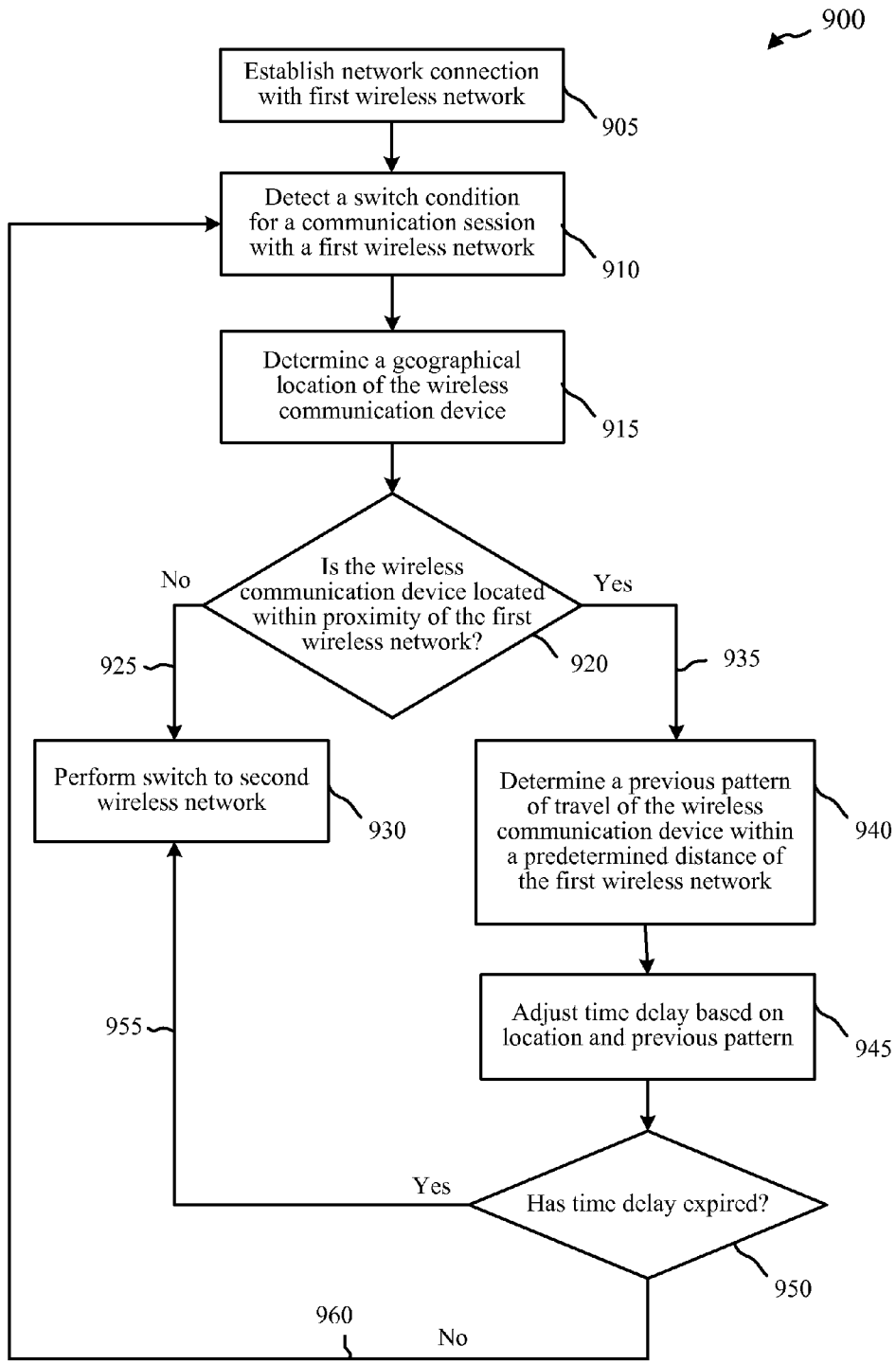
FIG. 9 is a flowchart of a method for a wireless communications device to perform a switch according to a context and use of a wireless network and a location of the wireless communications device, in accordance with various aspects of the present disclosure.

FIG. 9 is a flowchart of a method for a wireless communications device to perform a switch according to a context and use of a wireless network and a location of the wireless communications device, in accordance with various aspects of the present disclosure. For clarity, the method 900 may apply to aspects of one or more of the UEs 115 described with reference to any of FIGS. 1-3, and/or 6, and/or aspects of one or more of the apparatuses 405 as described with reference to FIGS. 4 and/or 5. In some examples, a UE or apparatus may execute one or more sets of codes to control the functional elements of the UE or apparatus to perform the functions described below. Some steps of the method 900 may be combined with the methods 700 and/or 800.

At block 905, the method 900 includes establishing a network connection with a first wireless network. For illustrative purposes only, the first wireless network will be discussed as a Wi-Fi network. The network connection may establish a communication session between a UE 115 and a base station 105 as described with reference to any of FIGS. 1-3. At block 910, the method 900 includes detecting a switch condition for a communication session of a first wireless network. The switch condition may be based on a performance indicator of the wireless network being below a threshold level. In some examples, the method 900 includes establishing a network connection with a first wireless network. For illustrative purposes only, the first wireless network will be discussed as a Wi-Fi network. The network connection may establish a communication session between a UE 115 and a base station 105 as described with reference to any of FIGS. 1-3.

Responsive to detecting the switch condition, the wireless communications device may determine a geographical location of the wireless communications device at block 915. The location of the wireless communications device may inform a value set on a sliding scale, such as described in reference to FIGS. 7 and 8. For example, the method 900 may include setting up a geographical boundary for each network (e.g., a geofence), such that the wireless communications device does not perform a switch when the wireless communications device is at specific locations within the geographical boundary. The geographical boundary may purposefully allow for a margin of error in drawing the boundaries such that small dead zones may be ignored (e.g., a far corner of a backyard for a home Wi-Fi network or an elevator shaft for a business Wi-Fi network) while larger dead zones (e.g., a sidewalk across the street for the home Wi-Fi network or a parking lot for the business Wi-Fi network) would be mostly recorded properly for exclusion from the coverage area. The wireless communications device may set up the geographical boundary based in part on collected latitude and longitude information. In some examples, the wireless communications device may determine a radius for the network and use the radius to create a circular geographic boundary. In some examples, the geographical boundary may be tagged with a reliability indicator for the network. In some examples, the method 900 includes record a reliability of the network over time. The method 900 may further include tagging the geographical boundary with the reliability of the network. The wireless communications device may use the reliability of the network to inform how long to wait before switching to another network.

At block 920, the method 900 may further include determining whether the wireless communications device is located within proximity of the first wireless network. Proximity of the first wireless network may be, for example, within a coverage area of the first wireless network and/or within a geographical boundary of the first wireless network. If the wireless communications device is not located within proximity of the first wireless network, the method 900 proceeds along path 925 to block 930. At block 930, the wireless communications device performs a switch to a second wireless network.

However, if the wireless communications device is located within proximity of the first wireless network, the method 900 proceeds along path 935 to block 940. In the example of FIG. 9, the method 900 may include determining a previous pattern of travel of the wireless communications device within a predetermined distance of the first wireless network. At block 945, the method 900 may include adjusting a time delay for performing a switch based at least in part on the location of the wireless communications device and the previous pattern of travel (e.g., if the wireless device regularly returns to the coverage area quickly versus if the wireless device regularly remains out of coverage for long periods of time).

At block 950, the method 900 may include determining whether the time delay has expired. If so, and the switch condition is still present, the method 900 may proceed along path 955 to block 930 for performing the switch to the second wireless network. If not, the method 900 may proceed along path 960 to block 910 and maintain the connection to the first wireless network. The method 900 may continue to monitor the time delay and the switch condition in order to perform a switch when the time delay expires.

An example that may utilize the method 900 is as follows. A geographical boundary may be set up for a first wireless connection, such as for a Wi-Fi router in a building. If the user of the wireless communications device moves to another building and the wireless communications device is not using data, the wireless communications device may use the sliding scale to determine when to switch to LTE based at least in part on a maximum value of the sliding scale, that is, the wireless communications device determines not to switch to LTE. This may result in ping-pongs being avoided when the user walks from one building to another, similarly, or when the user rides an elevator within the building where Wi-Fi coverage is lacking. However, once the geographical boundary is breached (e.g., the user reaches an exit of a parking lot for the building), the wireless communications device may set the sliding scale to zero to allow for quick switching to LTE.

Since some users spend very large amounts of time at home, work, or school with Wi-Fi coverage for their wireless communications devices, the examples and method described herein may save power and/or cellular data use. Furthermore, the techniques may be used when the wireless communications device is placed into a power-saving mode.

As described herein, the methods 700, 800, and 900 may provide for wireless communication. It should be noted that each of the methods 700, 800, and 900 illustrate just one implementation and that the operations of the methods 700, 800, and/or 900 may be rearranged or otherwise modified such that other implementations are possible.

The detailed description set forth above in connection with the appended drawings describes exemplary embodiments and does not represent the only embodiments that may be implemented or that are within the scope of the claims. The term "exemplary" used throughout this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Throughout this disclosure the term "example" or "exemplary" indicates an example or instance and does not imply or require any preference for the noted example. Thus, the disclosure is not to be limited to the examples and designs described herein but is to be accorded the broadest scope consistent with the principles and novel features disclosed herein.

What is claimed is:

1. A method for wireless communication, comprising:
   determining a context of data use of a first wireless network to which a wireless communications device is connected;
   determining a time delay associated with performing a switch from the first wireless network to a second wireless network when at least one performance indicator of the first wireless network is below a threshold performance level needed to support the context of data use;
   determining a geographical location of the wireless communications device;
   adjusting the time delay responsive to the wireless communications device being located within proximity of the first wireless network; and
   performing the switch from the first wireless network to the second wireless network in response to the time delay expiring while the at least one performance indicator remains below the threshold performance level, wherein the first wireless network is different from the second wireless network.

2. The method of claim 1, further comprising:
   determining an amount of data use, a frequency of data use, or a combination thereof; and
   maintaining a connection of the wireless communications device to the first wireless network based at least in part on the determined amount or frequency of data use.

3. The method of claim 2, wherein the amount of data use is determined to be intermittent, the frequency of data use is determined to be intermittent, or a combination thereof.

4. The method of claim 1, wherein determining the time delay further comprises one of:
   setting the time delay to zero responsive to the context of data use being a real-time data use,
   setting the time delay to a first time period that is less than a buffer size time period responsive to the context of data use being a streaming content data use,
   setting the time delay to a second time period responsive to the context of the data use being an intermittent data use, and
   setting the time delay to a third time period longer than the second time period responsive to the context of the data use being no data use for a fourth time period.

5. The method of claim 1, further comprising:
   maintaining a connection to the first wireless network responsive to the wireless communications device being located within proximity of the first wireless network.

6. The method of claim 1, further comprising:
   determining a previous pattern of travel of the wireless communications device within a predetermined distance of the first wireless network; and
   adjusting the time delay based at least in part on the previous pattern of travel.

7. The method of claim 6, wherein adjusting the time delay comprises:
   adjusting the time delay to a first time period if the previous pattern of travel of the wireless communications device indicates the wireless communications device will return or remain within proximity of the first wireless network during the first time period.

8. The method of claim 1, wherein the at least one performance indicator is a signal strength of the first wireless network, a signal quality of the first wireless network, a profile of the first wireless network, or a combination thereof.

9. The method of claim 1, further comprising:
   determining the at least one performance indicator is above the threshold performance level for the first wireless network; and
   performing a switch back to the first wireless network responsive to the at least one performance indicator being above the threshold performance level and based at least in part on a context of data use of the second wireless network.

10. The method of claim 1, wherein the first wireless network and the second wireless network use different protocols.

11. The method of claim 1, wherein the first wireless network and the second wireless network use different channels or frequencies for a same protocol.

12. The method of claim 1, further comprising:
    determining a value corresponding to the first wireless network based at least in part on the context of data use of the first wireless network by the wireless communications device,
    wherein determining the time delay is further based on the value.

13. An apparatus for wireless communication, comprising:
    means for determining a context of data use of a first wireless network to which a wireless communications device is connected;
    means for determining a time delay associated with performing a switch from the first wireless network to a second wireless network when at least one performance indicator of the first wireless network is below a threshold performance level needed to support the context of data use;
    means for determining a geographical location of the wireless communications device;

means for adjusting the time delay responsive to the wireless communications device being located within proximity of the first wireless network; and means for performing a switch from the first wireless network to the second wireless network in response to the time delay expiring while the at least one performance indicator remains below the threshold performance level, wherein the first wireless network is different from the second wireless network.

14. The apparatus of claim 13, further comprising:

means for determining an amount of data use, a frequency of data use, or a combination thereof; and means for maintaining a connection of the wireless communications device to the first wireless network based at least in part on the determined amount or frequency of data use.

15. The apparatus of claim 14, wherein the amount of data use is determined to be intermittent, the frequency of data use is determined to be intermittent, or a combination thereof.

16. The apparatus of claim 13, wherein means for determining the time delay further comprises one of:

means for setting the time delay to zero responsive to the context of the data use being a real-time data use, means for setting the time delay to a first time period that is less than a buffer size time period responsive to the context of the data use being a streaming content data use, means for setting the time delay to a second time period responsive to the context of the data use being an intermittent data use, and means for setting the time delay to a third time period longer than the second time period responsive to the context of the data use being no data use for a fourth time period.

17. The apparatus of claim 13, further comprising:

means for maintaining the connection to the first wireless network responsive to the wireless communications device being located within proximity of the first wireless network.

18. The apparatus of claim 13, further comprising:

means for determining a previous pattern of travel of the wireless communications device within a predetermined distance of the first wireless network; and means for adjusting the time delay based at least in part on the previous pattern of travel.

19. The apparatus of claim 18, wherein adjusting the time delay comprises:

means for adjusting the time delay to a first time period if the previous pattern of travel of the wireless communications device indicates the wireless communications device will return or remain within proximity of the first wireless network during the first time period.

20. The apparatus of claim 13, wherein the at least one performance indicator is a signal strength of the first wireless network, signal quality of the first wireless network, profile of the first wireless network, or a combination thereof.

21. The apparatus of claim 13, further comprising:

means for determining the at least one performance indicator is above the threshold performance level for the first wireless network; and means for performing a switch back to the first wireless network responsive to the at least one performance indicator being above the threshold performance level and based at least in part on a context of data use of the second wireless network.

22. The apparatus of claim 13, further comprising:

means for determining a value corresponding to the first wireless network based at least in part on the context of data use of the first wireless network by the wireless communications device, wherein means for determining the time delay is further based on the value.

23. A wireless communications device for wireless communication, comprising:

a memory that stores instructions; and a processor coupled with the memory, wherein the processor and memory are configured to:

determine a context of data use of a first wireless network to which the wireless communications device is connected;

determine a time delay associated with performing a switch from the first wireless network to a second wireless network when at least one performance indicator of the first wireless network is below a threshold performance level needed to support the context of data use;

determine a geographical location of the wireless communications device;

adjust the time delay responsive to the wireless communications device being located within proximity of the first wireless network; and perform a switch from the first wireless network to the second wireless network in response to the time delay expiring while the at least one performance indicator remains below the threshold performance level, wherein the first wireless network is different from the second wireless network.

24. The wireless communications device of claim 23, wherein the processor and memory are configured to:

determine an amount of data use, a frequency of data use, or a combination thereof; and maintain a connection of the wireless communications device to the first wireless network based at least in part on the determined amount or frequency of data use.

25. A non-transitory computer-readable storage medium storing computer-executable code for wireless communication, the code executable by a processor to:

determine a context of data use of a first wireless network to which a wireless communications device is connected;

determine a time delay associated with performing a switch from the first wireless network to a second wireless network when at least one performance indicator of the first wireless network is below a threshold performance level needed to support the context of data use;

determine a geographical location of the wireless communications device;

adjust the time delay responsive to the wireless communications device being located within proximity of the first wireless network; and perform a switch to a second wireless network in response to the time delay expiring while the at least one performance indicator remains below the threshold performance level, wherein the first wireless network is different from the second wireless network.

26. The non-transitory computer-readable storage medium of claim 25, wherein the code is executable by the processor to:

determine an amount of data use, a frequency of data use, or a combination thereof; and maintain a connection of the wireless communications device to the first wireless network based at least in part on the determined amount or frequency of data use.

* * * * *